United States Patent

[11] 3,620,886

[72] Inventors Marion W. Sims;
 Francisco C. Avila, both of Fort Wayne, Ind.
[21] Appl. No. 11,739
[22] Filed Feb. 16, 1970
[45] Patented Nov. 16, 1971
[73] Assignee General Electric Company

[54] METHOD FOR BONDING A LAMINATED STRUCTURE AND APPARATUS FOR APPLYING UNHARDENED ADHESIVE MATERIAL TO THE LAMINATED STRUCTURE
13 Claims, 8 Drawing Figs.

[52] U.S. Cl. .................................................. 156/563,
 29/205 R, 29/596, 29/609, 156/272, 156/305
[51] Int. Cl. ....................................................... B32b 31/20,
 H02k 15/02
[50] Field of Search ............................................ 156/60, 92,
 152, 305, 556, 563, 380; 29/596, 609, 205 R;
 118/219, 233, 254; 269/52; 310/42, 45

[56] References Cited
UNITED STATES PATENTS

| | | | |
|---|---|---|---|
| 3,356,360 | 12/1967 | Ward | 156/563 X |
| 3,518,754 | 7/1970 | Pleiss et al. | 29/609 X |
| 2,978,371 | 4/1961 | Baciu | 156/305 |
| 3,349,478 | 10/1967 | De Jean | 310/42 X |
| 3,490,143 | 1/1970 | Hull | 310/42 X |
| 3,408,734 | 11/1968 | Leahy et al. | 29/596 |

Primary Examiner—Benjamin A. Borchelt
Assistant Examiner—James M. Hanley
Attorneys—John M. Stoudt, Radford M. Reams, Ralph E. Krisher, Jr., Frank L. Neuhauser and Oscar B. Waddell ABSTRACT: Method and apparatus for applying unhardened adhesive material to a stack of laminations forming a laminated core for use in an inductive device, the core having spaced-apart tooth sections with at least some of the laminations having spaces therebetween at the termination portions of the tooth sections. The core is mounted to engage unhardened adhesive material carried on the peripheral surface of an applicator and relative motion is provided between the applicator and core for transferring unhardened material from the applicator to at least some of the laminations. An electromagnet is positioned adjacent at least some of the laminations and energized to apply a magnetic field to the core for ensuring separation of at least some of the laminations as the unhardened adhesive material is being applied to the termination portions thereof. The laminations may then be clamped together until the adhesive material hardens to firmly bond the laminations together, and this hardening step may be accomplished by placing the core in an oven which generates heat to cure or harden the adhesive material. The process may further include the step of applying an insulating material to selective surfaces of the core to form an integral insulating coating thereon.

PATENTED NOV 16 1971 3,620,886
SHEET 1 OF 2
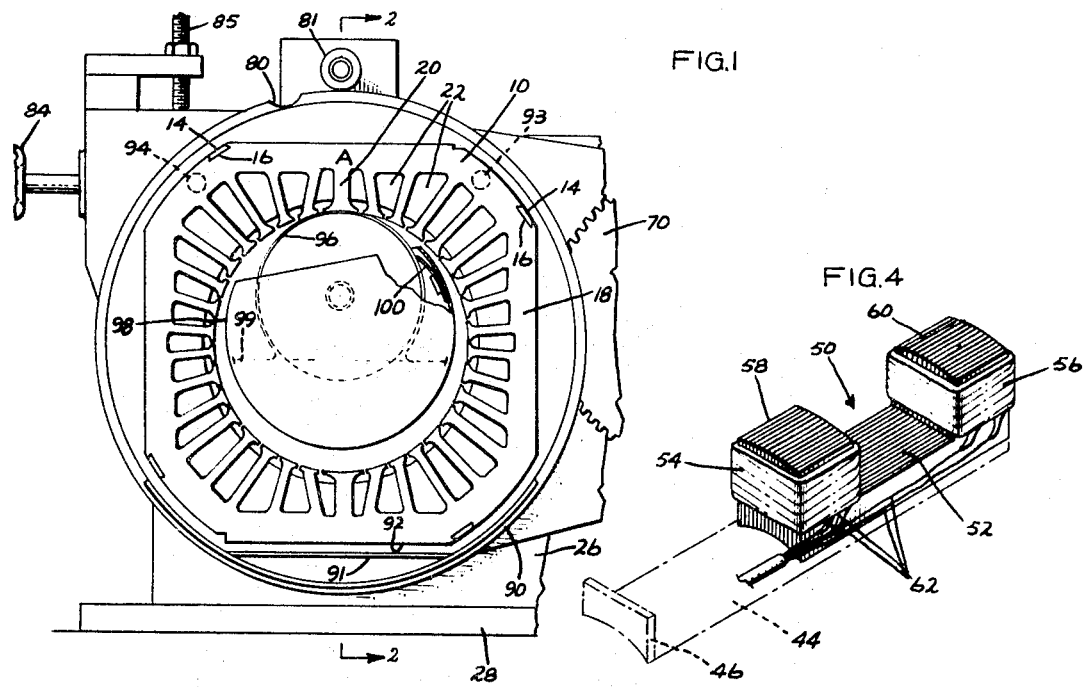
FIG.1
FIG.4
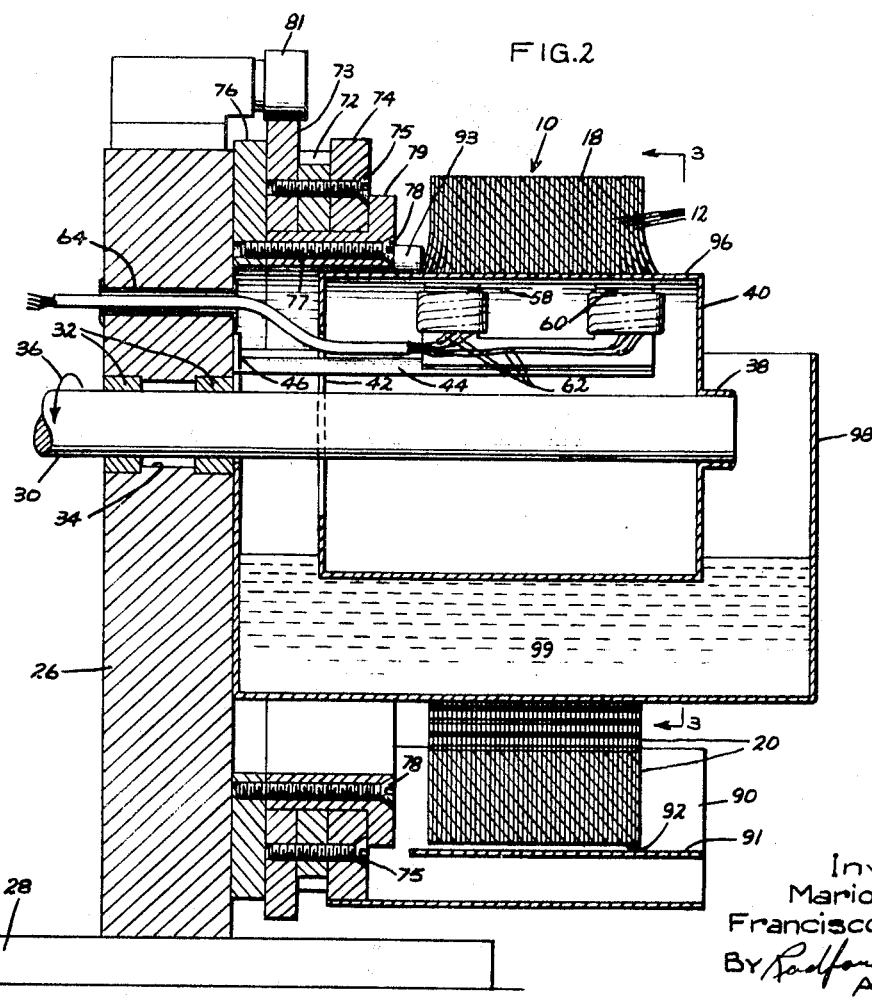
FIG.2
Inventors:
Marion W. Sims,
Francisco C. Ayila,
By Radford M. Reams
Attorney.

PATENTED NOV 16 1971 3,620,886
SHEET 2 OF 2
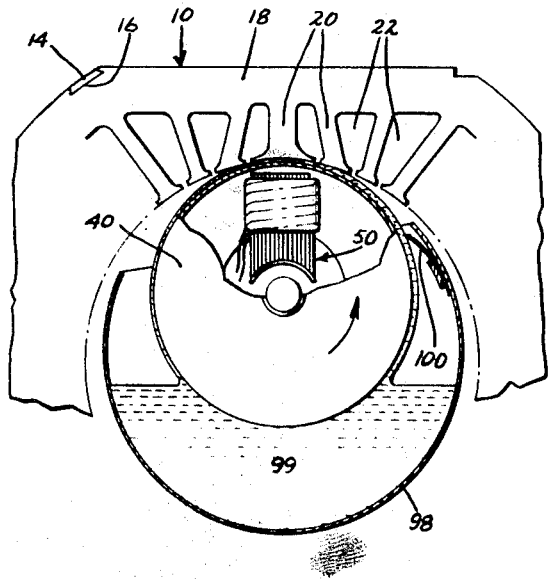
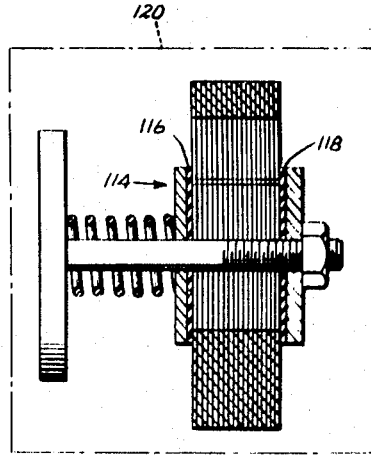
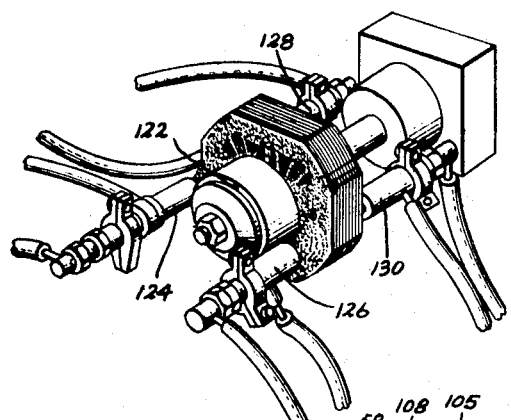
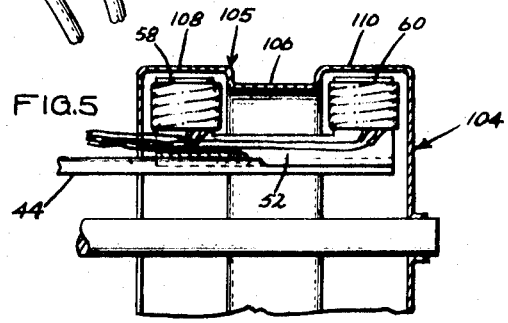
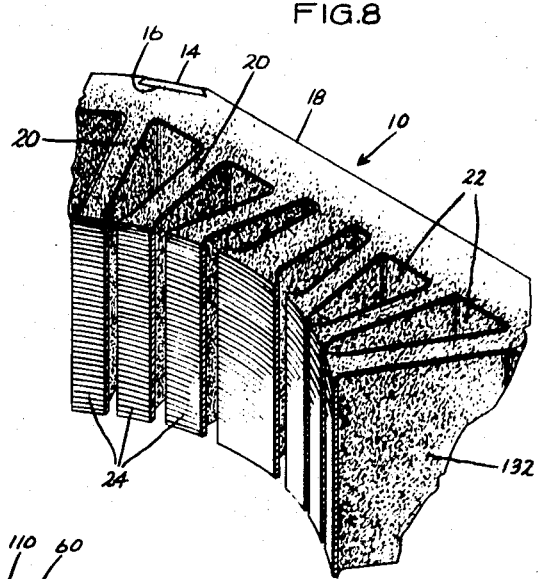
Inventors:
Marion W. Sims,
Francisco C. Avila,
By Redford M. Kiams
Attorney.

METHOD FOR BONDING A LAMINATED STRUCTURE AND APPARATUS FOR APPLYING UNHARDENED ADHESIVE MATERIAL TO THE LAMINATED STRUCTURE

CROSS-REFERENCE TO RELATED APPLICATIONS

The following applications, assigned to General Electric Company, the assignee of the present invention, are hereby incorporated by reference: application Ser. No. 609,051, now U.S. Pat. No. 3,533,867, filed for Harold R. Van Derzee on Jan. 13, 1967; application Ser. No. 802,934, filed for Marion W. Sims on Feb. 27, 1969; and Docket No. 03–LO–4088, filed for Leo M. Schlaudroff concurrently herewith.

BACKGROUND OF THE INVENTION

This invention relates generally to apparatus and methods for making laminated structures such as laminated cores for dynamoelectric machines, and more particularly to methods of firmly bonding together a laminated structure and apparatus for applying unhardened adhesive bonding material to a laminated structure.

Electric conductive devices such as transformers and dynamoelectric machines, for instance, conventionally include one or more core members, for example, dynamoelectric machines, i.e., motors and generators, conventionally include a stator core member and a rotor core member concentrically disposed with regard to the stator core member. At least one and frequently both of the core members have a plurality of coil or conductor receiving slots formed therein. In the case of the usual dynamoelectric machine with the stator outside the rotor, the stator core member has winding slots conventionally extending radially outward from a central bore and formed by a number of spaced-apart, generally radially extending tooth sections. Such core members conventionally are formed by securing together in a stacked configuration a plurality of relatively thin laminations punched from magnetic steel. The individual laminations often are not completely flat, that is their side faces are not completely planar, and they may have small burrs along the edges. Conventionally the laminations forming the stator core are secured together in a tightly stacked relation adjacent the outer edge of the core by some suitable means such as welding or key and slot arrangements. Even when the laminations of the core are secured tightly together in the outer or yoke portion, the individual laminations may have spaces therebetween. This is particularly true at the termination portions of the tooth sections, that is adjacent the bore. This tendency for there to be spaces between the laminations is most prevalent at the axial ends of the stator. When such stator cores are assembled with rotor cores and appropriate windings to form a complete motor, the spaces may cause the stator core to have less rigidity and structural integrity than is desirable and could, in fact, cause interference between the stator and the rotor.

It has also become desirable to provide an integral insulating material or coating on selected surfaces of stator cores, particularly along the surfaces forming the periphery of the coil or conductor receiving slots. It is generally very economical and expeditious to apply this insulating material either in a fluid form or as a powdered spray to form the integral insulation layer. Where there are spaces between individual laminations, as at the termination portion of the individual tooth sections, the integral insulating covering may not be an uninterrupted layer over the entire slot periphery, thus defeating the purpose of the integral insulation.

The aforementioned Schlaudroff application, filed concurrently herewith, illustrates an apparatus and method for applying unhardened adhesive material to the termination portions of the tooth sections of a core, particularly in the areas of laminations having spaces therebetween. This material is drawn into the spaces from the periphery of the tooth sections by a wicking or capillary action to fill the spaces. When the adhesive material is hardened it forms with the individual laminations a strong integrated bonded core.

In some cores all of the laminations in the area where at least some of the laminations have spaces therebetween, as at the axial end of the core in particular, may not have spaces therebetween and the spaces between some individual laminations may not extend to the terminal portion of that tooth section. In this event the unhardened adhesive material applied to terminal portions of the tooth sections will not be drawn between those laminations and the subsequent hardening of the adhesive material will not effect a true bonding of these laminations. At a later time these laminations may separate, with a corresponding deleterious effect on the structural integrity of the core, and may prevent a smooth, uninterrupted integral insulation coating in the coil or conductor receiving slots.

SUMMARY OF THE INVENTION

It is therefore an object of the present invention to provide an improved method for bonding a laminated structure.

It is another object of the present invention to provide an improved apparatus for applying an unhardened adhesive bonding material to a laminated structure.

It is another object of the present invention to provide such an apparatus for applying unhardened adhesive bonding material to fill spaces between selected adjacent laminations at the termination portions of the tooth sections of the laminated core and to insure that all of the selected laminations are separated as the unhardened adhesive material is being applied to the termination portions thereof.

It is another object of the present invention to provide a method for bonding together the laminations of the laminated core at the termination portions of the tooth sections of the core in which separation of laminations is ensured as unhardened adhesive material is applied to the termination portions.

In carrying out the invention in one form thereof, there is provided an apparatus for applying adhesive bonding material to a stack of laminations forming a laminated core for use in an inductive device. The core has tooth sections with at least some of the laminations having spaces therebetween at the termination portions of the tooth sections. The apparatus includes an applicator means adapted to carry on its peripheral surface unhardened adhesive material and means mounting the core for engaging the termination portions of the at least some of the laminations with unhardened adhesive material being carried on the peripheral surface of the applicator means. Means is included for providing relative rotary motion between that applicator means and the termination portions of the tooth sections to apply unhardened adhesive material to the termination portions of the at least some of the laminations and means is also included for applying a magnetic field to the core for ensuring separation of the at least some of the laminations as the unhardened adhesive material is being applied to the termination portions thereof. One embodiment of the method of bonding together a stack of laminations forming a laminated core for use in an inductive device, the core having a plurality of spaced-apart tooth sections forming conductor receiving slots therebetween with termination portions of adjacent tooth sections forming the entrance for the slot therebetween and at least some of the laminations having spaces therebetween at the termination portions of the tooth sections, comprises the steps of applying a magnetic field to the core for ensuring separation of the at least some of the laminations; applying unhardened adhesive material to the termination portions of the tooth sections in the area of the at least some of the laminations for filling the spaces therebetween; and then hardening the adhesive material to bond together the at least some of the laminations. The method may also include the step of hardening the adhesive material by heating the core and with the tooth sections being clamped together during the adhesive hardening step.

BRIEF DESCRIPTION OF THE DRAWINGS

FIG. 1 is a fragmentary front elevational view of an apparatus for applying unhardened adhesive material to a laminated structure while ensuring separation of selected laminations as the unhardened adhesive material is being applied thereto, in accordance with one embodiment of the present invention;

FIG. 2 is a somewhat enlarged cross-sectional view taken along line 2—2 of FIG. 1;

FIG. 3 is a fragmentary cross-sectional view as seen along line 3—3 of FIG. 2;

FIG. 4 is a perspective view of an electromagnet assembly used in the apparatus of FIGS. 1-3;

FIG. 5 is a partial sectional view showing another form of applicator drum which may be used in the apparatus of FIGS. 1-3;

FIG. 6 is a somewhat schematic view, partially in section, showing an apparatus for clamping the tooth sections of the core while the adhesive bonding material is being bonded;

FIG. 7 is a fragmentary perspective view of a portion of an apparatus for applying powdered insulating material to the heated core; and FIG. 8 is a partial perspective view of a completed core after an integral insulating coating has been formed on selected surfaces thereof.

DESCRIPTION OF THE PREFERRED EMBODIMENTS

Turning now to the drawings in more detail and in particular to FIGS. 1-4 inclusive there is illustrated an exemplification apparatus for applying unhardened adhesive bonding material to a laminated structure while ensuring separation of at least selected laminations while the unhardened adhesive material is being applied thereto, in accordance with one embodiment of the present invention. The exemplification apparatus is illustrated as incorporated in an overall unhardened adhesive material applying apparatus of the general type shown and described in the aforementioned Schlaudroff application, with only those portions of the apparatus illustrated as are advantageous for an understanding of the present invention. A more complete description of the additional details of the overall adhesive applying apparatus may be had by reference to the Schlaudroff application.

A laminated structure is illustrated in the form of a stator core 10 especially adapted for use in fractional or small horsepower-size dynamoelectric machines. The illustrative core 10 conventionally is fabricated from a plurality of laminations 12 punched from suitable sheet material such as magnetic steel and held together in a stacked relation by a plurality of keys 14 frictionally held in grooves 16 extending axially across the yoke section 18 of the core. Other conventional means for holding the laminations in such a stacked relationship include longitudinal welds extending along the outer peripheral surface of the yoke section 18 at selected positions. As best seen in FIGS. 1 and 2, the core comprises the yoke section 18 and a number of inwardly projecting tooth sections 20, which form annularly spaced-apart coil or conductor accommodating slots 22. The free ends of the tooth sections are formed as termination portions 24 which define therebetween entrances to the slots 22. It will be understood that the termination portions 24 of the tooth sections 20 are formed from corresponding termination portions of corresponding teeth of the individual laminations. A central rotor receiving bore is defined by the peripheral surface of the termination portions of all of the tooth sections.

Even though the laminations of the core are mechanically clamped in the yoke section, the portions of the laminations forming the tooth sections 20 tend to have spaces therebetween, particularly at the termination portions of the tooth sections 20. These spaces, particularly those caused by flaring between adjacent laminations, are particularly noticeable at the several axially outermost laminations of the tooth sections. However, all of the individual laminations may not have the spaces therebetween, even adjacent the axial ends of the core and all of the spaces may not extend to the termination portions of the tooth sections.

The exemplification apparatus includes a frame 26 mounted on a base plate 28. A shaft 30 is mounted for rotation in a pair of bearings 32 fixed in a bore 34 formed in the frame 26. Shaft 30 is driven in the direction indicated by arrow 36 by some suitable means such as, for example, an electric motor and suitable drive mechanism, as illustrated in the aforementioned Schlaudroff application. Fixed to shaft 30 is a flange 38 of a cylindrical applicator drum 40. The axial end of the drum 40 closest to the frame 26 is formed with an opening 42 through which extends a support arm 44. One end 46 of the support arm is attached to the frame 26 while the other end supports a generally U-shaped electromagnet assembly 50 comprising a U-shaped magnetic core 52 having legs or distal ends 58 and 60. Coils 54, 56 are wound on the distal ends 58, respectively. The electromagnet assembly 50 is shown in greater detail in the enlarged view of FIG. 4. Leads 62 extend from the coils 54 and 56 through the opening 42 in the drum 40 and then through a suitable insulated opening 64 in the frame 26 for connection to a source of electrical energy (not shown). As desired, the source of electrical energy may provide either direct current or alternating current for the purpose of energizing the electromagnet assembly to apply a magnetic field to at least the axial outermost laminations 12 forming each tooth section of the core 10 when the tooth sections are located in position A (FIG. 1). The electromagnet assembly may be energized by applying electrical energy either continuously or in pulses as desired.

The apparatus also includes a gear 70 which meshes with a gear 72. The gear 72 is mounted between a pair of bearing plates 73, 74 by some suitable means such as bolts 75. The gear 72 is driven at a suitable speed, as by the gearing illustrated in the copending Schlaudroff application, so that the gear 72 rotates with the same annular speed as the shaft 30.

An arm 76 is pivotally mounted on the same shaft (not shown) as gear 70 and supports a generally annular bearing member 77, which is mounted to the arm 76 by some suitable means such as bolts 78. The gear 72, and its bearing plates 73, 74 are held between the pivoted arm 76 and a generally radial extension 79 of the bearing 77. Thus the gear 72, bearing plate 73 and bearing plate 74 are free to rotate about the bearing 77 while, at the same time, being constrained for pivotal movement with the arm 76.

As best seen in FIG. 1, the outer peripheral edge of bearing plate 73 is provided with an indentation 80 which is positioned to selectively engage a roller 81. When the roller 81 is engaged in the indentation 80, it exerts a restraining force on the bearing plate 73 which is sufficient to prevent rotation of the gear 72 and bearing plates 73, 74 while the shaft 30 continues to rotate. In order to release bearing plate 73, so that the combination of gear 72 and bearing plates 73, 74 may rotate with the shaft 30, the left-hand end of arm 76 (as seen in FIG. 1) is provided with a handle 84 by which the user may depress the left-hand end of arm 76, that is rotate arm 76 in a counterclockwise direction to release the roller 81 from the indentation 80. A threaded stop member 85 is provided to engage the top surface of frame 26 just after the roller 81 is disengaged from the indentation 80 to limit the amount of counterclockwise movement of the pivoted arm 76. Thereafter the roller 81 engages the outer peripheral surface of the bearing plate 73 until the combination of gear 72 and bearing plates 73, 74 have made a complete revolution. At this time roller 81 will reenter the indentation 80 and allow the pivoted arm 76 to rotate back in a clockwise direction.

As best seen in FIGS. 1 and 2, a trough 90 is welded or otherwise fixably secured to a segment of the outer periphery of bearing plate 74 opposite the location of the indentation 80 in bearing plate 73. A flat plate 91 is welded across the bottom of trough 90 to releasably engage a lower flat surface 92 of stator core 10. With the arm 76 pivoted to its most clockwise position (that is with roller 81 in indentation 80) a stator core 10 may be placed on the apparatus with its flat bottom portion 92 resting against the flat plate 91 and slid over the applicator drum 40 until one lateral face of the core engages positioning pins 93, 94. The positioning pins are mounted on bearing plate 74 in position to engage the yoke section 18 of the core. Additionally the positioning pins 93, 94 are of a suitable length that, when the lateral face of the core 10 engages them the several axially outermost laminations of the core will be in alignment with the distal ends 58, 60 of the electromagnet 52. With arm 76 in this position, the termination portions 24 of the tooth sections 20 of the core are spaced somewhat from the peripheral surface 96 of the applicator drum 40.

Fixed to the frame 26 is a reservoir or tank 98 containing a supply of unhardened adhesive bonding material 99 which may, for example, be heat hardenable epoxy resin of somewhat viscous liquid form, i.e., in a state of plasticity, for example, as it is described in U.S. Pat. No. 3,490,143—B. Hull. The level of liquid 99 is such that the lower portion of the applicator drum 40 is immersed in the liquid. In operation of the apparatus, the shaft 30 constantly rotates the applicator drum 40 so that the peripheral surface 96 of the applicator drum is continuously rotated through the unhardened adhesive material. A doctor blade 100 may be mounted to the tank 98 with one edge adjacent the peripheral surface 96 of the drum 40 as the peripheral surface immerges from the body of liquid 99. Thus the doctor blade will regulate the thickness of unhardened adhesive material on the peripheral surface 96.

In order to apply the adhesive bonding material to the termination portions of the tooth sections, particularly to those areas having laminations with spaces therebetween, a core 10 is placed on the apparatus with flat surface 92 resting against flat plate 91 and one lateral face of the core engaging the positioning pins 93 and 94. Then the operating handle 84 is depressed momentarily to release the roller 81 from the indentation 80. This drops the trough 90 and flat plate 91 away from the lower portion of the core 10 so that the core moves downwardly and the termination portions 24 of the tooth sections 22 engage the unhardened adhesive material on the peripheral surface 96 of the applicator drum 40. The applicator drum 40 is rotating with the shaft 30 in the direction of arrow 36. The engagement of the termination portions of the tooth sections with unhardened adhesive material on the peripheral surface 96 causes the core to rotate in the same direction as the applicator drum, with the peripheral surface 96 of the applicator drum progressing sequentially across the termination portions of the individual tooth sections. At the same time gear 72 and bearing plates 73, 74 are rotated in the same direction and, should the core 10 slip with respect to the applicator drum 40, it will quickly engage the trough or flat plate and further slippage will be prevented. This ensures complete application of the adhesive material. When the bearing plate 73 has made one complete revolution, the roller 81 will enter the indentation 80, allowing arm 76 to pivot in a clockwise direction. This causes flat plate 91 to reengage the lower flat surface 92 of the core 10 and raise the core sufficiently that the adhesive material is no longer transferred from the peripheral surface 96 of the drum to the termination portions 24 of the tooth sections 20.

At least during rotation of the core with the drum, the electromagnet assembly 50 is energized to apply a magnetic field to the core, particularly to the several outermost laminations of the tooth sections as they are in engagement with the unhardened adhesive material. This magnetic field ensures separation of the termination portions of at least the several laminations adjacent the axially outer ends of the core. The electromagnet assembly 50 is fixed in position so that substantially only the tooth sections to which unhardened adhesive material is being applied are subject to this magnetic field.

After a complete revolution the core 10 may be removed from the apparatus and replaced with another core, which then is similarly treated. The continuous rotation of the applicator drum, even when a core is not being treated, assures that the adhesive bonding material on the peripheral surface of the drum does not dry or become tacky.

Another form of applicator drum suitable for use in the apparatus of FIGS. 1-3 is illustrated in FIG. 5. This applicator drum 104 has a peripheral surface 105 with a reduced diameter central portion 106 separating a pair of raised end portions 108 and 110. The distal ends 58, 60 of the electromagnet core 52 fit within the raised end portions 108, 110 respectively. The applicator drum 104 applies adhesive material only to the axially outermost lamination areas of a core 10 whereas the drum 40 applies adhesive material along the entire terminal portions of the tooth sections.

With either illustrated drum the magnetic field ensures separation of at least the several laminations adjacent the axially outer ends of the core so that the unhardened adhesive material applied to the termination portions of the tooth sections will be drawn between these laminations by a capillary or wicking action and all of these laminations will have bonding material therebetween. When the adhesive bonding material hardens, the hardened material and laminations together form a strong structurally integrated core and together form continuous surfaces along the sides of the slots 22 as they extend through the core.

Preferably the tooth sections are clamped together during the curing or hardening step. By way of illustration FIG. 6 illustrates one such suitable clamping device, as described in more detail in the aforesaid Schlaudroff application. In FIG. 6 the clamping device 114 includes surfaces 116, 118 of a suitable material such as polytetrafluoroethylene to engage the tooth sections of the core and prevent the outer laminations of the core from sticking to the clamping surfaces. When the adhesive material is of the epoxy resin type as described in above indicated Hull patent, the adhesive material may be cured to harden it more quickly by placing it in an oven, such as that schematically indicated at 120, which may be heated by some suitable means such as heat lamps.

After the adhesive material has hardened, the heated core may be removed from the oven and transferred to a powdered insulating material applying apparatus such as partially illustrated in FIG. 7, and described and illustrated in more detail in DeJean et al. U.S Pat. No. 3,355,310, assigned to General Electric Company, assignee of the present invention. The DeJean et al. apparatus consists essentially of a core holder and masking device 122 which clamps and rotates the core between two pairs of powdered insulating material applying nozzles 124, 126 and 128, 130. The nozzles spray the powdered insulating material on selected surfaces of the heated core, such as the surfaces of the coil and conductor receiving slots to form an integral insulating coating on these selected surfaces.

FIG. 8 illustrates a portion of a core 10 bonded by the apparatus and method of this invention and having an integral insulating coating 132 on selected surfaces thereof, such as the lateral faces of the end laminations and the surfaces of the slots 22 formed between the tooth sections 20.

It will be understood from the foregoing description that, although the illustrated exemplification of the principles of the invention were applied to a laminated stator core for use in a dynamoelectric machine, the invention can be advantageously carried out with laminated rotors for dynamoelectric machines and other laminated structures adapted for use in other electromagnetic devices, where it is desired to bond together laminations having spaces therebetween. In particular, even though a stator core with a central bore has been illustrated it will be understood that a rotor core having tooth sections extending generally outwardly from the center of a core, rather than inwardly, also may contain laminations which have spaces therebetween to which adhesive material may be applied in accordance with the present invention to bond together the laminations. It also will be understood that the application of the adhesive bonding material and its curing or hardening to form a unified structure has advantages even where it is not desired to provide an integral insulating material on selected surfaces of the core.

It should be apparent to those skilled in the art that, while there has been described what, at present, are considered to be the preferred embodiments of this invention, in accordance with the Patent Statutes, changes may be made in the disclosed apparatus and method without actually departing from the true spirit and scope of the invention.

What we claim as new and desire to secure by Letters Patent of the United States is:

1. Apparatus for applying an adhesive bonding material to a stack of laminations forming a laminated core for use in an inductive device, the core having tooth sections with at least some of the laminations having spaces therebetween at the termination portions of the tooth sections; said apparatus including: applicator means adapted to carry on its peripheral surface unhardened adhesive material; means mounting the core for engaging the termination portions of the at least some of the laminations with unhardened adhesive material being carried on the peripheral surface of said applicator means; means for providing relative rotary motion between said applicator means and the termination portions of the tooth sections to apply unhardened adhesive material to the termination portions of the at least some of the laminations; and means for applying a magnetic field to the core for ensuring separation of the at least some of the laminations as the unhardened adhesive material is being applied to the termination portions thereof.

2. Apparatus as set forth in claim 1 wherein said means for applying a magnetic field is at least one electromagnetic device positioned adjacent the termination portions of the at least some of the laminations engaging the unhardened adhesive material on said peripheral surface of said applicator means.

3. Apparatus as set forth in claim 1 wherein said applicator means is a hollow drum and said means for applying a magnetic field is an electromagnetic device fixedly mounted within said drum.

4. Apparatus for applying an adhesive bonding material to a stack of laminations forming a laminated core for use in an inductive device, the core having a plurality of spaced-apart tooth sections forming spaced-apart conductor receiving slots with termination portions of adjacent tooth sections forming the entrance for the slot therebetween, at least some of the laminations having spaces therebetween at the termination portions of the tooth sections, said apparatus including: applicator means having a peripheral surface adapted to carry unhardened adhesive material; mounting means for positioning the core for predetermined engagement between the termination portions of the at least some of the laminations and unhardened adhesive material on the peripheral surface of said applicator means; means for providing relative rotary motion between said applicator means and the termination portions of the tooth sections for transfer of unhardened adhesive material from said applicator means to the at least some of the laminations; and means for applying a magnetic field to the core for ensuring separation of the at least some of the laminations as the unhardened adhesive material is concurrently being applied to the termination portions thereof.

5. Apparatus as set forth in claim 4 wherein said means for applying a magnetic field is at least one electromagnetic device positioned adjacent the termination portion of the at least some of the laminations engaging the unhardened adhesive material on said peripheral surface of said applicator means.

6. Apparatus as set forth in claim 4 wherein said applicator means is a hollow drum and said means for applying a magnetic field is an electromagnetic device fixedly mounted within said drum.

7. Apparatus as set forth in claim 4 wherein said applicator means is a hollow drum adapted to transfer unhardened adhesive material to the termination portions of laminations adjacent the axial ends of the core and said means for applying a magnetic field is an electromagnet fixedly mounted within said drum having a distal end disposed adjacent the termination portion of the laminations having unhardened adhesive material transferred thereto.

8. A method of bonding together a stack of laminations forming a laminated core for use in an inductive device, the core having a plurality of spaced-apart tooth sections forming conductor receiving slots therebetween with termination portions of adjacent tooth sections forming the entrance for the slot therebetween, at least some of the laminations having spaces therebetween at the termination portions of the tooth sections, said method comprising the steps of: applying a magnetic field to the core for ensuring separation of the at least some of the laminations; applying unhardened adhesive material to the termination portions of the tooth sections in the area of the at least some of the laminations for filling the spaces therebetween; and then hardening the adhesive material to bond together the at least some of the laminations.

9. A method as set forth in claim 8 wherein the unhardened adhesive material is sequentially applied to at least selected tooth sections, the magnetic field being concentrated in at least the selected tooth sections as unhardened adhesive material is being applied thereto.

10. A method as set forth in claim 8 wherein the core is heated to harden the adhesive material and the tooth sections are clamped together during the adhesive hardening step.

11. A method of bonding together a stack of laminations forming a laminated core for use in an inductive device, the core having tooth sections with at least some of the laminations having spaces therebetween at the termination portions of the tooth sections, said method comprising the steps of: providing an applicator means carrying on its peripheral surface unhardened adhesive material; mounting the core for engaging the termination portions of the at lest some of the laminations with the unhardened adhesive material on the peripheral surface of the applicator means; applying a magnetic field to the core for ensuring separation of the at least some of the laminations while providing relative rotary motion between the applicator means and the termination portions of the tooth sections to apply unhardened adhesive material to the termination portions of the at least some of the laminations; and then hardening the adhesive material to bond together the at least some of the laminations.

12. A method as set forth in claim 11 wherein the magnetic field is concentrated in the tooth sections having laminations to which unhardened adhesive material is being applied.

13. A method as set forth in claim 11 wherein the termination portions of the tooth sections are sequentially brought into engagement with the unhardened adhesive material on the peripheral surface of the applicator means, and the magnetic field is concentrated sequentially in the tooth sections as their termination portions are brought into engagement with the unhardened adhesive material.

* * * * *